Aug. 4, 1959   E. B. ANDERSON   2,897,663
CONSTANT VELOCITY UNIVERSAL JOINT
Filed Jan. 6, 1959   2 Sheets-Sheet 2
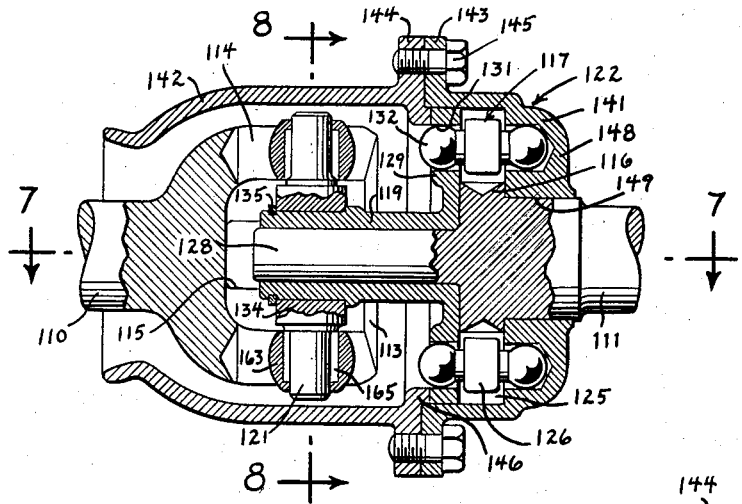
Fig. 6
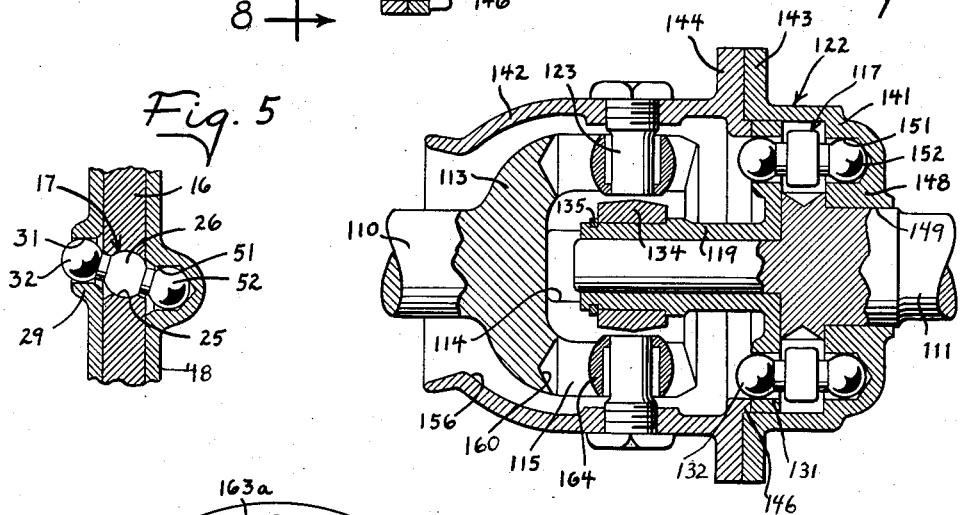
Fig. 5
Fig. 7
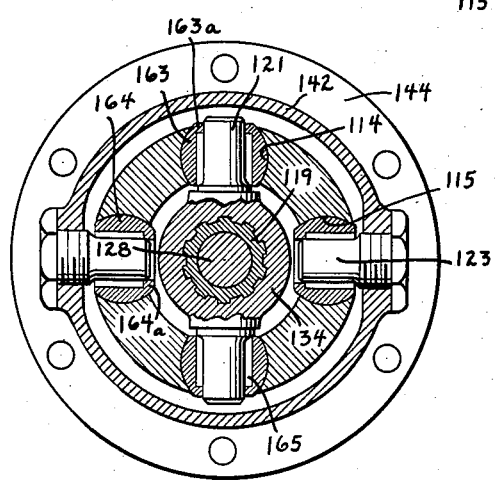
Fig. 8
Inventor
Edmund B. Anderson
By McCanna, Morsbach & Pillote
Atty's

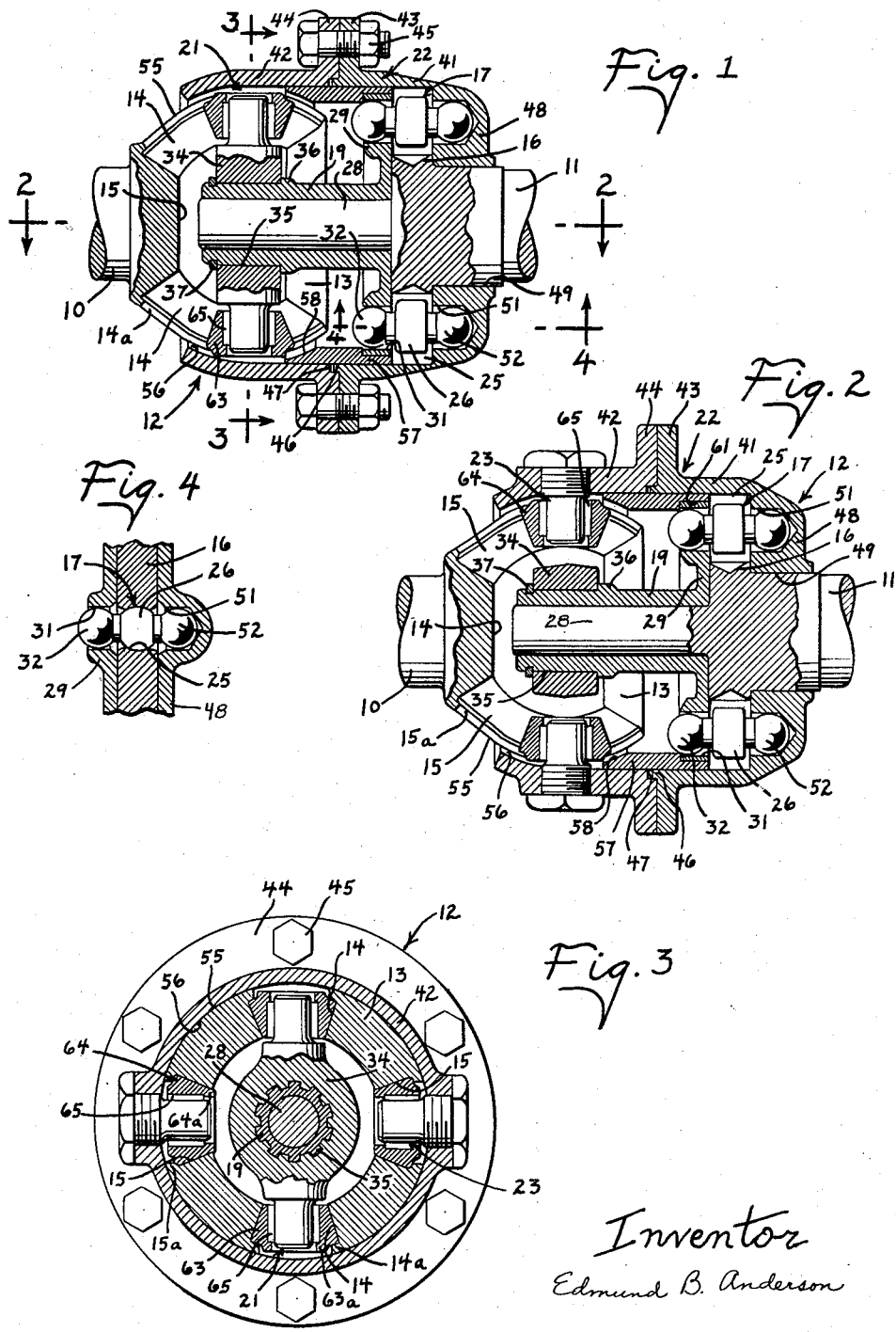

United States Patent Office 2,897,663
Patented Aug. 4, 1959

2,897,663

CONSTANT VELOCITY UNIVERSAL JOINT

Edmund B. Anderson, Rockford, Ill., assignor of one-half to Walter H. Stark, Rockford, Ill.

Application January 6, 1959, Serial No. 785,234

13 Claims. (Cl. 64—21)

This invention relates to universal joints and particularly to a uniform velocity universal joint.

Various important objects of this invention are to provide a uniform velocity universal joint which is of simple and economical construction and which is rugged and durable in use.

Another object of this invention is to provide a uniform velocity trunnion type universal joint in which the trunnions can be made relatively short to provide a more rigid and durable universal joint.

A more particular object of this invention is to provide a trunnion type universal joint having two sets of trunnions and a plurality of equalizing levers spaced axially from the trunnions and having a novel arrangement for operatively connecting the several equalizing levers to the trunnions.

These, together with various ancillary objects and advantages of this invention will be more readily appreciated as the same becomes better understood by reference to the following detailed description when taken in connection with the accompanying drawings wherein:

Figure 1 is a longitudinal sectional view through the universal joint of the present invention and illustrating one embodiment thereof;

Fig. 2 is a longitudinal sectional view taken on the plane 2—2 of Figure 1;

Fig. 3 is a transverse sectional view taken on the plane 3—3 of Figure 1;

Fig. 4 is a fragmentary sectional view taken on the plane 4—4 of Figure 1;

Fig. 5 is a fragmentary sectional view similar to Fig. 4 and illustrating the position of one of the equalizing levers when the torque transmitting members are in angular relation;

Fig. 6 is a longitudinal sectional view through a modified form of uniform velocity joint adapted for limited axial slip;

Fig. 7 is a longitudinal sectional view taken on the plane 7—7 of Fig. 6, and

Fig. 8 is a transverse sectional view taken on the plane 8—8 of Fig. 6.

Reference is now made more specifically to Figs. 1 and 2 wherein there is illustrated a pair of shafts or torque transmitting members 10 and 11 which are operatively connected to each other by a constant velocity universal joint 12. The first torque transmitting member 10 terminates in a hollow ball member 13 having first and second pairs of raceways 14 and 15 formed therein. The other torque transmitting member 11 has a carrier 16 thereon and a plurality of equalizing levers 17 mounted on the carrier for pivotal movement relative thereto about an axis intermediate the ends of the equalizing levers. A first element 19 is provided to operatively connect one end of each of the levers 17 to a first pair of trunnions 21, and a second element 22 is provided for operatively connecting the other ends of the levers 17 to a second pair of trunnions 23.

In accordance with the present invention, the element 19 extends internally of the hollow ball member 13 and the trunnions 21 thereon extend outwardly into the raceways 14. The element 22 is in the form of a hollow cage and surrounds the ball member 13, with the trunnions 23 thereon extending inwardly into the recesses or guideways 15 in the ball member. More particularly, the carrier 16 is of the form of an annular collar or ring conveniently formed integrally with the second torque member or shaft 11 to extend radially outwardly therefrom and which has a plurality of annularly spaced sockets 25 formed therein. The sockets herein shown are in the form of bores, the axis of which extends radially of the shaft 11, and the equalizing levers 17 each have a central preferably cylindrical portion 26 which is journaled in a respective bore 25 to support the levers therein for pivotal movement about axes extending radially of the shaft 11.

A stub shaft 28 is formed on the end of the second torque member 11 and extends axially thereof to a point internally of the hollow ball member 13. The element 19 is in the form of a sleeve and is rotatably supported on the stub shaft 28. A flange 29 is formed on one end of the element 19 and abuts against one face of the carrier 16. The flange 29 has a plurality of annularly spaced openings 31 therein, each individual to one of the levers 17. The openings 31 are cylindrical and have the axes thereof disposed parallel to the axis of the shaft 11. Each of the levers 17 has a spherical end portion 32 which extends into the openings 31. The trunnions 21 are nonrotatably attached to the other end of the element 19 and, as shown herein, the trunnions are formed integrally with a ring member 34 which is non-rotatably splined or keyed to the sleeve 19, as indicated at 35. The ring 34 abuts against a flange 36 on the sleeve 19 and is retained thereon by a split ring 37.

The other element or cage 22 extends around the carrier 16 and around the ball member 13. The cage is conveniently formed in two parts designated 41 and 42 having flanges 43 and 44 on the adjacent ends which are secured together by fasteners 45. One of the sections such as 41 is preferably formed with a centering rib 46 which is adapted to extend into a recess 47 in the other section to properly center the sections relative to each other. The section 41 also has an inwardly extending flange portion 48 on one end thereof which defines an annular bearing surface 49 rotatably supported on the shaft 11. The flange portion 48 abuts against the carrier 16 and has a plurality of bores 51 therein, the axis of which extends parallel to the axis of the shaft 11. The other ends of the levers 17 terminate in spherical end portions 52 which extend into the bores 51. The other pair of trunnions 23 are mounted on the cage 22 and extend radially inwardly thereof into the guideways 15 in the ball member 13. Conveniently, the trunnions 23 may be formed on the ends of bolts which are threaded into the cage, as is clearly shown in Figs. 2 and 3.

In the embodiment of Figs. 1–5, the cage 22 is arranged to swively support the ball member 13, to prevent axial movement thereof, and for this purpose the ball member is formed with spherical surfaces 55 between the guideways 14 and 15, and the section 42 of the cage 22 is arched inwardly to form one surface 56 of a semi-spherical socket, the center of which socket lies at the point where the axis of the shaft 11 intersects the plane of the trunnions 21 and 23. A sleeve 57 is disposed within the cage 22 and has a semi-spherical surface 58 formed thereon and arranged to engage the outer surface 55 of the ball member to swively support the same. The sleeve 57 extends across the joint between the sections 41 and 42 of the cage 22 and abuts against the end face of the carrier 16. The sleeve has a recess 61 formed therein to receive the outer periphery of the flange 29, and which recess defines a shoulder which engages the outer face of the flange to retain the same in assembled relation against the carrier 16.

The trunnions 21 and 23 have rollers 63 and 64 rotatably supported thereon by needle bearings 65. The rollers on the trunnions 21 have an inwardly extending flange 63a which engages the outer ends of the needle bearings 65 to retain the same in position and the rollers 64 on the trunnions 23 have an inwardly extending flange 64a on the inner end thereof engageable with the needle bearings. In order to provide true rolling motion between the rollers 63 and 64 and the respective guideways, the rollers are formed with conical outer surfaces, the center of which is located at the centerline of the shaft 11. The guideways 14 and 15 are formed with relatively diverging side walls to receive the conical rollers and each has an inwardly extending rib 14a and 15a respectively which engage the outer edges of the rollers to retain the same in the guideways.

When the shafts 10 and 11 are in alignment, the angular velocity of the trunnions 21 and 23 is constant and the elements 19 and 22 are driven in unison with the shafts. Under these conditions, the compensating levers 17 will remain in the position shown in Fig. 4. However, when the shafts 10 and 11 are angulated with respect to each other, the trunnions 21 and 23 do not rotate at a uniform angular velocity. Consequently, the elements 19 and 22 will oscillate relative to the shaft 11, in relatively opposite directions, twice during each revolution of that shaft. The angular displacement of the elements 19 and 22 is zero, as illustrated in Fig. 4, when the plane defined by angulated shafts 10 and 11 extends through one of the trunnions 21 or 23. The angular displacement of the elements 19 and 22 relative to the shaft 11 reaches a maximum, as illustrated in Fig. 5, when the shafts are rotated 45° from the above-mentioned position.

The universal joint illustrated in Figs. 6–8 is similar to that shown in Figs. 1–5 and includes first and second torque transmitting members 110 and 111. As in the preceding embodiment, a carrier 116 is mounted on the torque member 111 and has sockets or bores 125 therein which receive the cylindrical portions 126 of the equalizing levers 117. A stub shaft 128 is provided on the end of the shaft 111 and rotatably supports the sleeve element 119. A flange 129 is formed at one end of the sleeve 119 and has bores 131 therein for receiving the spherical ends 132 on the levers 117. A cage member 122 surrounds the carrier 116 and is formed in two sections designated 141 and 142 having flanges 143 and 144 connected by fasteners 145. The section 141 has an inwardly extending flange portion 148 defining an annular bearing surface 149 which is rotatably supported on the shaft 111. An inwardly extending rib 146 is provided on the section 142 and abuts against the outer face of the flange 129, to retain the same in assembled relation against the carrier 116.

As also described in connection with the preceding embodiment, a first set of trunnions 121 are mounted on the element 119, and conveniently are secured to a ring member 134 which is splined to the element 119 and retained in position thereon by a split ring 135. A second set of trunnions 123 are attached to the cage 122, as by threaded engagement therewith as shown in Fig. 7. Bores 151 are formed in the flange portion 148 of the cage and receive the spherical end portions 152 on the levers 117.

In the embodiment of Figs. 6–8, the universal joint is arranged for limited slip and for this purpose the first torque transmitting member 110 is formed with a hollow member 113 having guideways 114 and 115 therein which extend parallel to the axis of the torque member or shaft 110. The guideways 114 and 115 are formed with a circular cross-section and receive spherical rollers 163 and 164 which are rotatably supported by needle bearings 165 on the trunnions 121 and 123 respectively. The rollers 163 and 164 have inwardly extending ribs at the outer and inner edges thereof respectively engageable with the needle bearings to retain the same in position. The section 142 of the cage, which supports the trunnions 123, loosely surrounds the hollow member 113 so that the member is free to float axially through a limited movement. Inward movement of the member 113 is limited by the shoulder 160 at the end of each of the guideways 114 and 115, which shoulder is arranged to engage the rollers 163 and 164. Outward movement of the member 113 is limited by the inwardly flared portion 156 on the section 142 of the cage.

The levers 117 serve to compensate for the nonuniform velocity of the trunnions 121 and 123, when the joint is operating through an angle, in the same manner as that described in connection with the preceding embodiment. However, the embodiment of Figs. 6–8 is also adapted to permit limited axial slip between the torque transmitting members 110 and 111 while providing the constant angular velocity.

I claim:

1. A constant velocity universal joint comprising a first hollow torque transmitting member open at one end and having first and second pairs of raceways respectively intersecting the inner and outer surfaces thereof, a second torque transmitting member, a plurality of equalizing levers mounted on said second member for pivotal movement relative thereto about an axis intermediate the ends of the levers, first and second elements mounted coaxial with said second torque transmitting member for rotation relative thereto, said first element engaging one end portion of said levers and extending internally of said first torque transmitting member, a first pair of outwardly extending trunnions on said first element extending outwardly thereof into said first pair of raceways, said second element engaging the other end portion of said levers and extending around said first torque transmitting member externally thereof, and a second pair of inwardly extending trunnions on said second element extending into said second pair of raceways in said first torque transmitting member.

2. The combination of claim 1 wherein said second element defines a protective enclosure for said equalizing levers and said trunnions of the universal joint.

3. The combination of claim 1 including means on said second element rotatably engaging said first element to retain the latter in assembled relation on said second torque transmitting member.

4. The combination of claim 1 including means on said second element defining a spherical socket, said first torque transmitting member having a spherical outer surface engaging said spherical socket in said second element, and said first and second pairs of raceways extending along arcs concentric with said spherical outer surface of said first torque member.

5. The combination of claim 1 wherein said first and second pairs of raceways extend parallel to the axis of said first torque member to permit limited slip between said first and second torque members, said second element loosely surrounding said first torque member to define an enclosure therefor.

6. A constant velocity universal joint comprising a first hollow torque transmitting member open at one end and having first and second pairs of raceways respectively intersecting the inner and outer surfaces thereof, a second torque transmitting member, a carrier on said second torque member, a plurality of equalizing levers mounted on said carrier for pivotal movement about an axis intermediate the ends of the levers, said second torque member having an axial portion extending therefrom at one side of said carrier into said one end of said first torque member, a first element mounted on said axial portion of said second member for rotary movement relative thereto, said first element engaging one end portion of each of said levers on said carrier and extending internally of said first torque member, a first set of trunnions on said first element extending outwardly into said first pair of raceways in the first torque member, a second element rotatably supported on said second torque member at the other side of said carrier and engaging the other end portions of each of said levers, said second element extending around said first element and said first torque transmitting member externally thereof, and a second pair of trunnions on said second element extending inwardly into said second pair of raceways in said first torque member.

7. The combination of claim 6 wherein said raceways in said first torque member extend parallel to the axis thereof, said trunnions engaging said raceways to permit limited axial and angular tilting movement between said first and second torque members.

8. A constant velocity universal joint comprising a first hollow torque transmitting member open at one end and having first and second pairs of raceways respectively intersecting the inner and outer surfaces thereof, a second torque transmitting member, an annular carrier extending outwardly from said second torque member, a plurality of equalizing levers mounted on said carrier for pivotal movement about axes extending radially of said second torque member, a first element mounted on said second torque member for rotary movement relative thereto and having an outwardly extending flange at one end thereof abutting said carrier at one side thereof, said flange on said first element engaging one end portion of each of said levers on said carrier, said first element extending from said carrier, said first element extending from said carrier internally of said first torque member, a first pair of trunnions on said first element extending outwardly into said first pair of raceways, a second sleeve element having an inwardly extending flange at one end thereof rotatably supported on said second torque member and abutting the other side of said carrier, said flange engaging the other ends of said levers, said sleeve element extending around said first element and said first torque transmitting member, and a second pair of trunnions on said sleeve extending inwardly into said second pair of raceways in said first torque member.

9. The combination of claim 8 including means on said sleeve element rotatably engaging said flange on the first element to retain the same against said carrier.

10. The combination of claim 8 wherein said second torque member has a stub shaft extending from said one side of the carrier into said first torque member, said first element being rotatably supported on said stub shaft.

11. The combination of claim 8 wherein said first torque member has a spherical outer surface, and means on said sleeve element defining a spherical socket for said first torque member.

12. The combination of claim 8 wherein said first torque member has a spherical outer surface, a ring in said sleeve element, said ring having means adjacent one end thereof rotatably engaging said flange on the first element to retain the same against said carrier, and means on the other end of said ring and on said sleeve element defining a spherical socket for said first torque member.

13. The combination of claim 12 wherein said sleeve element is formed in two axially separable sections, and means for releasably securing said sections together.

References Cited in the file of this patent

UNITED STATES PATENTS

| | | |
|---|---|---|
| 2,672,740 | Dunn | Mar. 23, 1954 |
| 2,691,876 | Wildhaber | Oct. 19, 1954 |
| 2,802,352 | Anderson | Aug. 13, 1957 |